United States Patent [19]
Libit et al.

[11] Patent Number: 5,638,994
[45] Date of Patent: Jun. 17, 1997

[54] MOLDED BOTTLE WITH TRIGGER BULB PUMP

[75] Inventors: Jeffrey M. Libit, 13244 Circulo Largo Ct. NE., Albuquerque, N.M. 87112; Sidney M. Libit, Longboat Key, Fla.

[73] Assignee: Jeffrey M. Libit, Albuquerque, N.M.

[21] Appl. No.: 531,410

[22] Filed: Sep. 21, 1995

[51] Int. Cl.$^6$ ............................................. B67D 5/42
[52] U.S. Cl. .................... 222/207; 222/210; 222/211; 222/215; 222/382
[58] Field of Search .......................... 222/207, 210, 222/211, 212, 215, 383.1, 382, 385; 239/333

[56] References Cited

U.S. PATENT DOCUMENTS

| | | | |
|---|---|---|---|
| Re. 33,480 | 12/1990 | Guss et al. | 222/207 |
| 178,096 | 5/1876 | Ballou et al. | 222/207 |
| 644,131 | 2/1900 | Ertsman | 222/207 |
| 2,212,582 | 8/1940 | Bellah | 222/207 |
| 3,486,663 | 12/1969 | Humphrey | 222/207 |
| 3,715,060 | 2/1973 | Benson | 222/207 |
| 4,330,071 | 5/1982 | Ohlson | 222/207 |
| 4,640,441 | 2/1987 | Bunschoten | 222/207 |
| 5,303,851 | 4/1994 | Libit et al. | 222/207 |
| 5,558,257 | 9/1996 | Braun | 222/215 X |

*Primary Examiner*—Andres Kashnikow
*Assistant Examiner*—Kenneth Bomberg
*Attorney, Agent, or Firm*—Laff, Whitesel, Conte & Saret, Ltd.

[57] ABSTRACT

A bottle for spraying or dispensing liquids comprising a principal chamber, a siphon tube extending alongside the chamber and a separate trigger bulb connected to the top of the siphon tube. The siphon tube is also pinch molded so that a valve seat is formed therein. When the trigger bulb is decompressed, the liquid that is drawn up into the siphon tube cascades over into the trigger bulb. When the trigger bulb is fully primed, any pressure subsequently applied to the trigger bulb will cause the liquid to be sprayed out of the bottle.

18 Claims, 5 Drawing Sheets

MOLDED BOTTLE WITH TRIGGER BULB PUMP

FIELD OF THE INVENTION

This invention relates generally to plastic spray pump and dispensing pump bottles and, more particularly, to plastic bottles having an integrally molded trigger bulb pump.

BACKGROUND OF THE INVENTION

A window cleaner spray bottle is an example of the kind of spray bottles which the present invention addresses. Hard surface sprayers, hair and cosmetic sprayers and pesticide sprayers are additional examples of applications addressed by this invention.

Conventional spray bottles such as these, however, comprise numerous parts and are relatively expensive to manufacture and assemble. In fact, the spray mechanisms of these bottles often cost more than the product contained within the bottle. Also, the spray bottles are usually relatively complicated, so that many small parts must be handled and assembled during manufacture. For example, many spray mechanisms include piston-style pumps, trigger handles, siphon tubes, and nozzles permitting variable spray configurations. Moreover, because some probability of failure during operation exists for each part, there are almost certainly a higher than necessary number of faulty bottles.

Another problem associated with conventional spray bottles is that some of the product is wasted. For example, a conventional window cleaner spray bottle contains a tube in the center of the bottle for drawing liquid up into the spray mechanism. The tube stops short of the bottom of the bottle so that the bottom does not block liquid from the tube. Thus, when the bottle is almost empty, any liquid below the tube will remain in the bottle. Also, more than the desired amount of product may be sprayed upon each application, thereby resulting in waste, because neither the volume of the product to be delivered nor the duration of the spray can be easily controlled.

An additional important consideration is the spray bottle's ease of use. Many people, especially the elderly and people with arthritic hands, may have difficulty manipulating conventional trigger sprayers. A significant force is required to depress the trigger of some spray bottles. Thus, it is desirable to provide a spray bottle with a trigger that may either be finger-driven or palm-driven and which achieves the maximum available pound per square inch (PSI) for spraying the liquid. It would also be desirable if the trigger included a finger grip configuration to improve user comfort, as well as make the trigger easier to hold and squeeze.

Another consideration with respect to ease of use involves large capacity sprayers. Large capacity sprayers, such as those currently used in the garden industry, require two hands. The large bottle or container must be carried in one hand, while the sprayer is held in the other. A large capacity spray bottle that can be held in one hand and be either finger-driven or palm-driven would be significantly less cumbersome and more efficient to use.

With the increasing emphasis that is being placed on environmental issues, the ability to refill the spray bottle with more product rather than dispose of the empty bottle is extremely important. However, because many users may prefer to purchase a new bottle instead, spray bottles should be made of a recyclable material.

U.S. Pat. No. 5,303,851 (Libit et al.) discloses a spray or dispensing bottle with an integrally molded pump to overcome some of the disadvantages associated with conventional spray bottles. The molded bottle with trigger bulb pump of the present invention offers improvements to the bottle shown in the Libit et al. patent.

SUMMARY OF THE INVENTION

The present invention is directed to a molded bottle for spraying or dispensing liquids. The bottle includes a principal liquid chamber and a siphon tube which extends alongside the chamber and receives liquid therefrom. The siphon tube is also pinch molded so that a valve seat is formed therein. A separate trigger bulb is connected to the top of the siphon tube for receiving and holding the liquid which is drawn up into the tube when the trigger bulb is decompressed. After the trigger bulb is fully primed with liquid any pressure subsequently applied to the trigger bulb will cause the liquid to be sprayed out of the bottle through a one-way exit valve located above the trigger bulb chamber which keeps air from entering the trigger bulb during its decompression.

The molded bottle with trigger bulb is both economically appealing and environmentally acceptable. Aside from being recyclable and refillable, the spray bottle comprises few parts, requires a minimal amount of assembly and reduces the probability of failure. Moreover, the user can easily select and control the volume and duration of the dispensed product, thereby resulting in less waste. The molded bottle is also easy to use because the trigger bulb can be either finger-driven or palm-driven, thus achieving maximum pound per square inch (PSI) for spraying the liquid. The design of the bottle and trigger bulb additionally facilitates the elastic recovery and insures rapid refill.

DETAILED DESCRIPTION OF THE INVENTION

Figure 1:
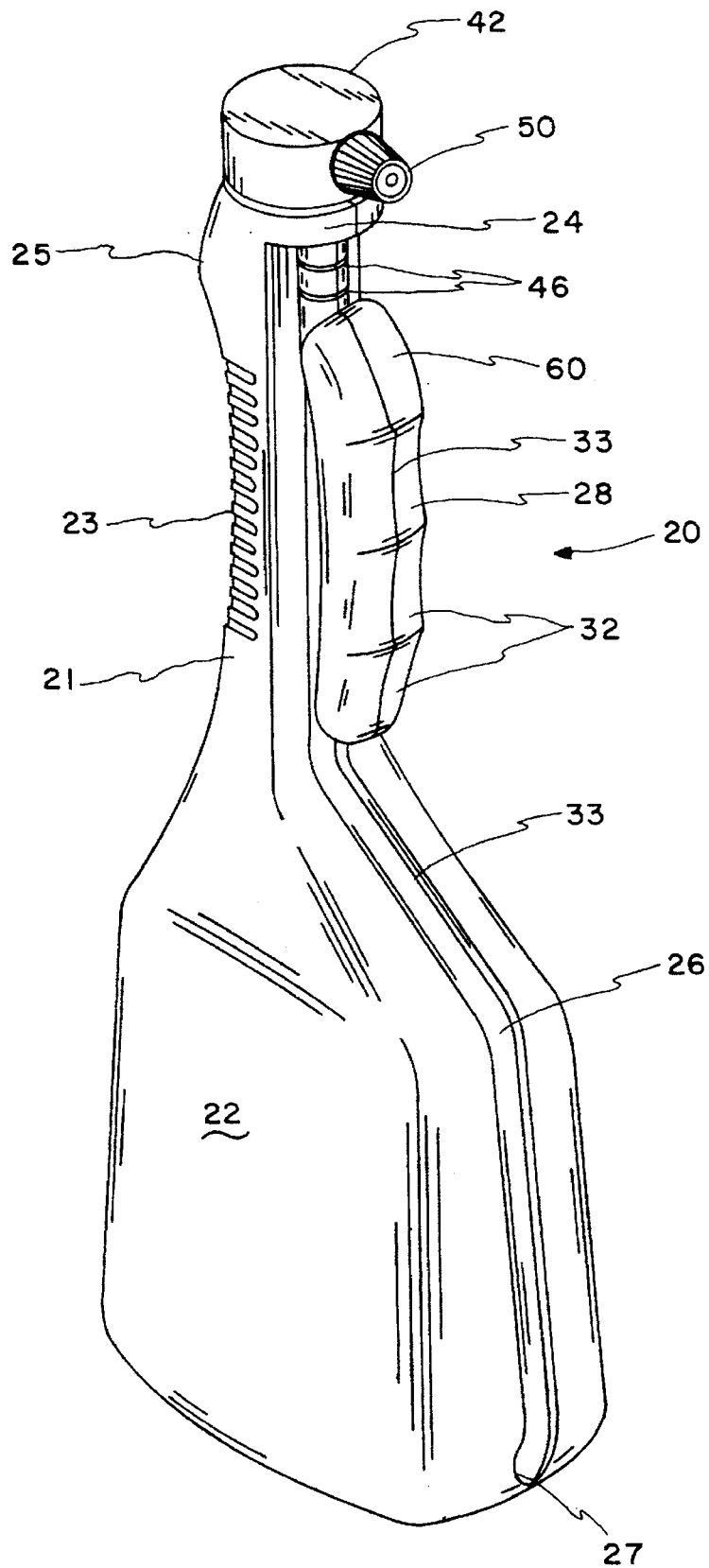
FIG. 1 is a perspective view of the spray bottle with a finger-driven trigger bulb pump.
Figure 2:
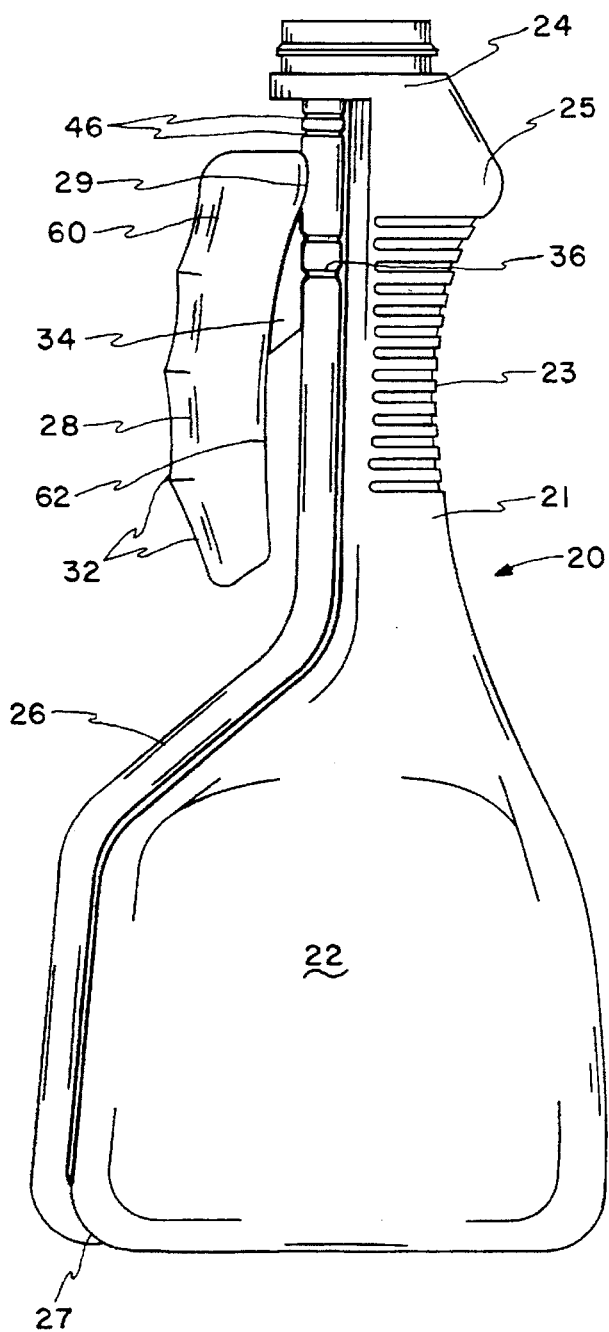
FIG. 2 is a side elevation view of the bottle of FIG. 1.

The present invention is directed to a spray bottle 20, as shown in FIG. 1. The spray bottle 20 is preferably blow-molded, although it may be made by any suitable process. It is preferred that the bottle be made of a plastic which is fairly easy to squeeze, but with a plastic memory sufficient to cause the bottle to return to its original shape when it is released after it has been squeezed. Suitable plastics include all densities of polyethylene, polypropylene, polyethylene terephthalate (PET) and polyvinylchloride (PVC), as well as other plastic compounds.

As shown in FIGS. 1-5, the bottle 20 has a principal liquid or fluid containing chamber 22 which may be filled and refilled via a conventional neck opening 24. Chamber 22 further includes a narrow neck portion 21 having a series of ridges or depressions 23 formed on one surface therein for gripping. A shoulder 25 protrudes from neck 21 above ridges 23 to further improve the grip for the bottle. The bottle has a siphon tube 26 integrally formed with, but outside of, chamber 22 as the bottle is blow molded. At 27, the bottom of the tube 26 is in open communication with the interior of the chamber 22. Therefore, as the level of the liquid or fluid rises with the filling of the chamber 22, that same liquid or fluid also rises in the tube 26.

A separate trigger bulb pump 28 having an outer wall 60, preferably convex, and an opposing inner wall 62 is integrally molded to, but separate from, the siphon tube 26 and is in liquid-flow communication therewith only at the top of the tube at 29. A web 34 desirably separates and spaces the trigger bulb 28 from the siphon tube 26.

Figure 5:
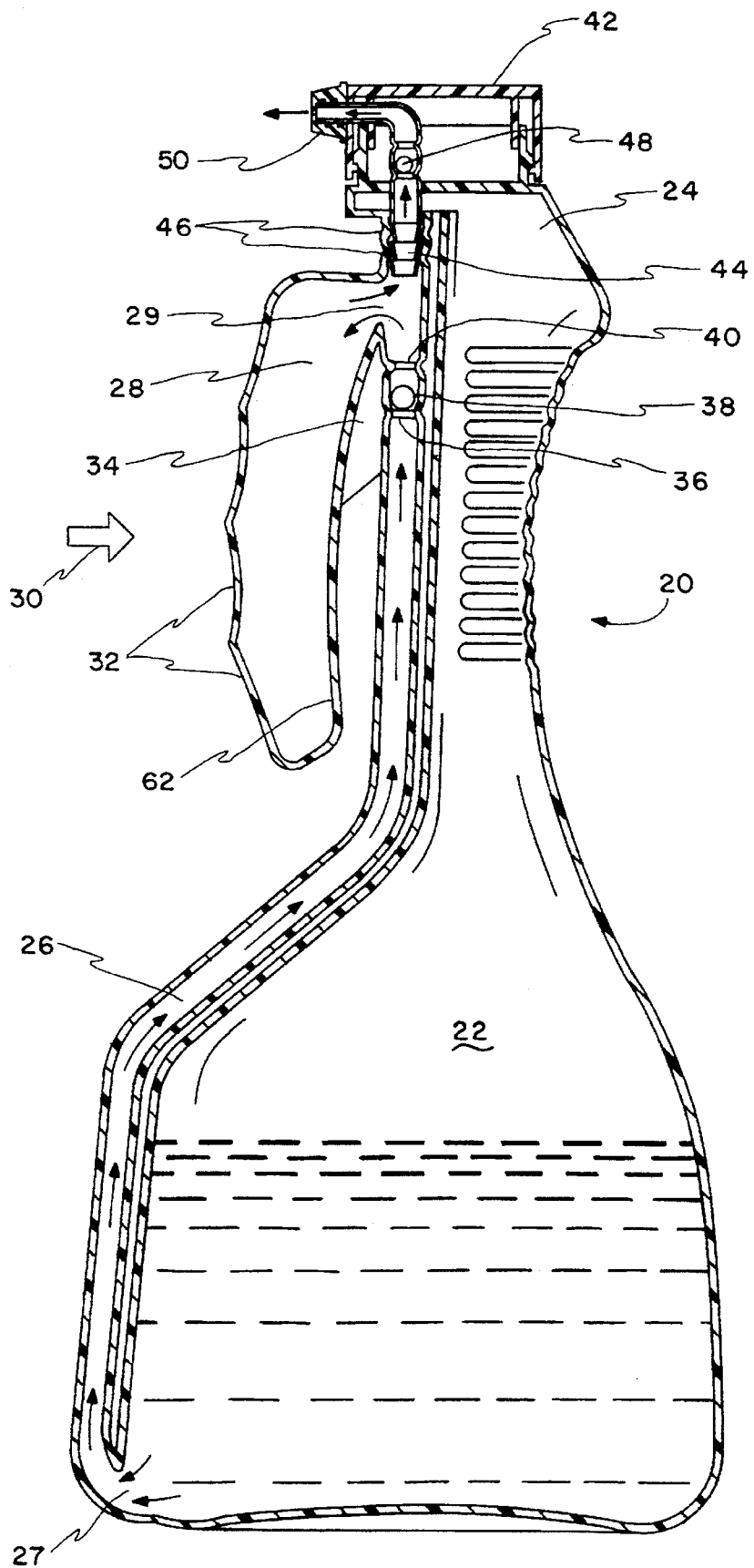
FIG. 5 is a cross-sectional view of the bottle taken along 5—5 of FIG. 4.
Figure 4:
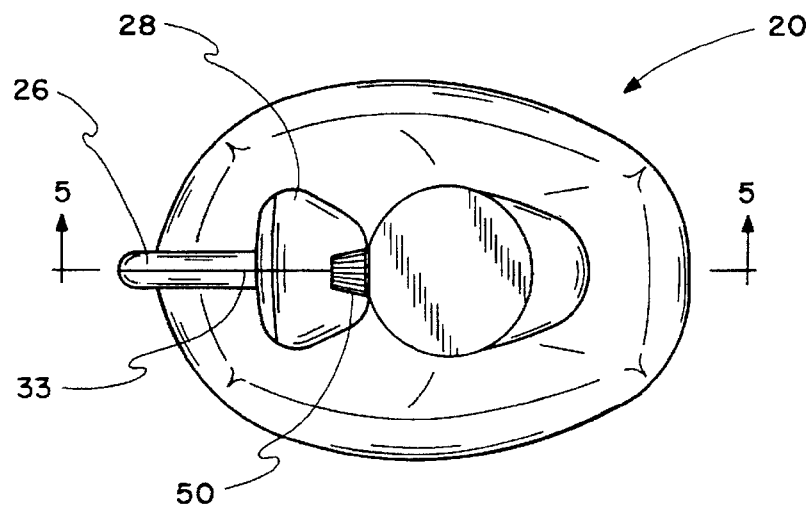
FIG. 4 is a top plan view of the bottle.

The integral siphon tube 26 is pinch molded in a manner that creates a valve seat 36 within the siphon tube 26. A check valve 38 is placed at a position above the valve seat 36 and adjacent to the opening 29 between the trigger bulb 28 and the siphon tube 26, as shown in FIG. 5. The check valve 38 may be any suitable device, such as a duck bill valve, a flapper or a ball bearing and be of a compatible material and greater density than the materials being dispersed. Also, if a ball bearing is utilized as the check valve 38, the siphon tube 26 should have two protrusions 40 extending inward to prevent the ball bearing from rising up too far and failing to function. Alternatively, a sleeve gasket (not shown) may be utilized to serve the same purpose, as well as to create a seal between a cap 42 and the inner diameter of the siphon tube 26. The purpose of the check valve is to stop back pressure, i.e., to prevent back-flow into the siphon tube 26.

A suitable cap 42 may be screwed or press-fit onto the spray bottle 20. The cap preferably includes a stalactite member 44 which extends down into the integral siphon tube 26. The siphon tube 26 may include two or more protrusions 46 that extend inward and hold the stalactite 44 and cap 42 securely in place.

The cap 42 for the spray bottle 20 preferably includes a second check valve 48. The check valve 48 may be any suitable device, such as a sliding piston, a duck bill valve or a ball bearing. This check valve prevents air from entering the spray bottle. However, even if a small amount of air is allowed in through check valve 48 in cap 42, the trigger bulb 28 will remain primed, as described hereafter.

On top of the cap 42, there is a suitable conventional nozzle 50 through which the fluid escapes as it is sprayed from the bottle. This nozzle 50 may have any geometry which is most convenient for the intended use. Here, the nozzle is shown as a tube molded into the cap 42. However, the nozzle could also take other forms, such as a pedestal which projects above the cap or simply a pinhole on the cap, depending on the liquid to be dispensed and the application intended.

To use the spray bottle of the present invention, liquid is poured into neck opening 24. As the spray bottle 20 is filled, the liquid level rises within principal chamber 22 and siphon tube 26. Once the bottle is filled with liquid (FIG. 5), one finger, multiple fingers, or a hand applies a pressure 30 against empty trigger bulb 28 and forces any air in the bulb through check valve 48 and out nozzle 50. Pressure 30 reduces the volume of the trigger bulb 28. When the pressure 30 is released, the memory of the plastic causes the bulb 28 to return to its original shape, thereby creating a vacuum inside the bulb because air cannot return from the atmosphere through check valve 48. The vacuum in trigger bulb 28 causes the liquid within siphon tube 26 be drawn up and to cascade into the trigger bulb through opening 29. Once this is done, the trigger bulb is primed to dispense liquid with the next squeeze of the trigger bulb, and it will remain primed so long as there is liquid in the chamber 22.

The next time that a pressure 30 is applied to the now fully-primed trigger bulb 28, check valve 38 prevents a back-flow of fluid from the bulb 28 to the principal chamber 22 through tube 26. Rather, the fluid is forced from bulb 28 into the cap 42 through the check valve 48 and out the nozzle 50. As the fluid leaves the bottle, atmospheric air may flow through an air vent in the cap and into the chamber 22 in order to replace the fluid displaced as it is sprayed from the bottle.

The volume of the spray product to be delivered depends upon the size of the trigger bulb 28. Preferably, the trigger bulb will hold one or more ounces of liquid. In a preferred embodiment, the trigger bulb holds approximately one ounce of liquid and about one-third of an ounce is delivered with each squeeze of the bulb.

The user is also able to select and control the volume and duration of the sprayed or dispensed liquid through the hand compression force applied to the trigger bulb and the duration of applying the force. In other words, a small, short squeeze produces a small amount of sprayed or dispensed liquid and a hard, long squeeze produces a large amount of sprayed or dispensed liquid.

Figure 3:
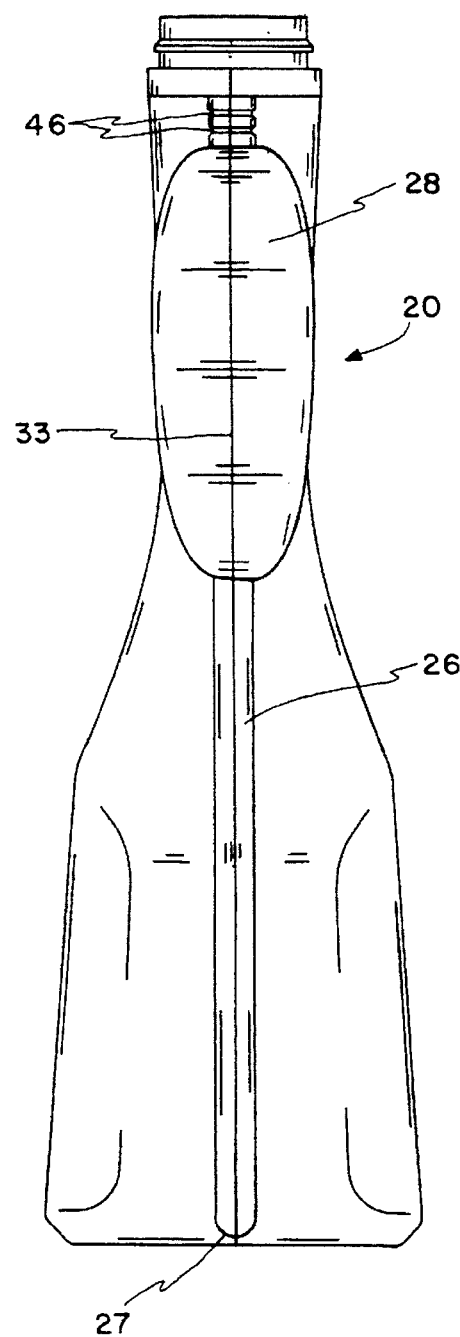
FIG. 3 is an front elevation view of the bottle.

The trigger bulb 28 and bottle 20 is ergonomically designed with a finger grip configuration 32 so that the maximum pound per square inch (PSI) for spraying the liquid is generated by the human hand. The finger grips not only improve comfort, but also make the trigger easier to hold and squeeze. Moreover, the trigger bulb preferably contains a parting seam 33 down its center, as shown in FIG. 3, which enhances the elasticity of the plastic. The web 34 prevents the opening 29 between the trigger bulb and siphon tube from getting pinched when bulb 28 is squeezed, and thus blocking fluid flow. Moreover, the web produces a trigger bulb spring-back action following compression, thereby increasing the elastic recovery rate and the refill rate of the trigger bulb. Thus, the finger grip configuration 32, ergonomically designed construction of the trigger bulb 28, the parting seam 33 and the web 34 all combine to facilitate the rapid elastic recovery of the trigger bulb and to insure a rapid refill rate with an adequate vacuum.

Figure 6:
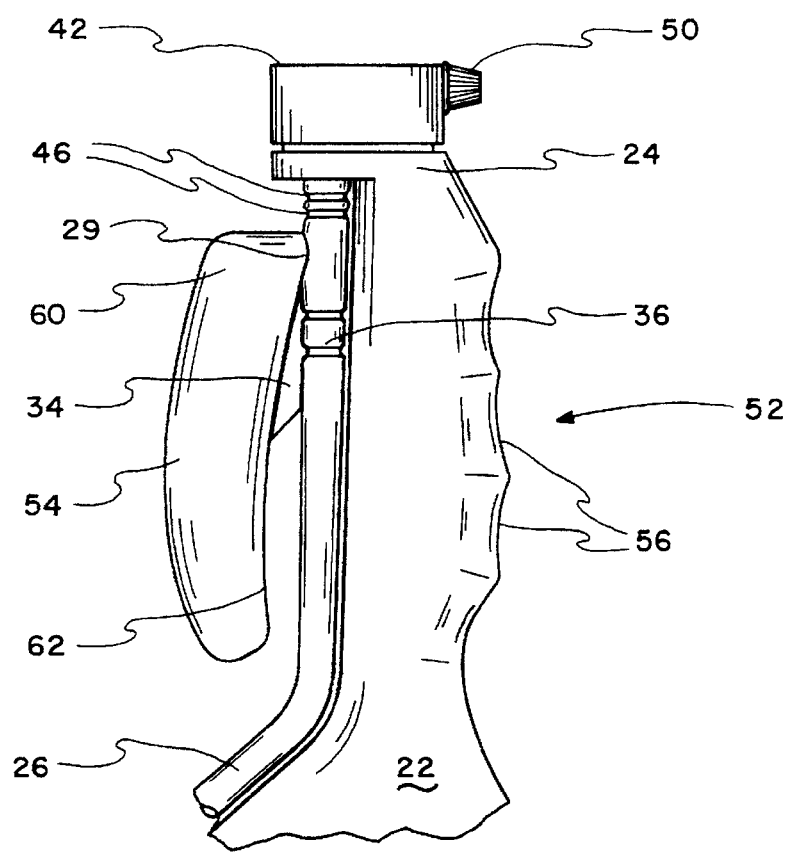
FIG. 6 is a partial side elevation view of a second embodiment of the spray bottle with a palm-driven trigger bulb pump.

The spray bottle 52 shown in FIG. 6 is a second embodiment of the present invention. The reference numerals designate corresponding parts in FIGS. 1–5. The embodiment of FIG. 6 has a smooth convex trigger bulb 54 so that it can be squeezed by the palm of the hand rather than the fingers. A finger grip configuration 56 is provided on the bottle opposite trigger bulb 54. When the bulb is squeezed by the palm, it collapses, with the results described above in connection with pressure 30. This embodiment with palm-driven trigger bulb 54 provides a mechanical advantage because it enables a person with less physical strength or arthritis in the fingers to easily use the spray bottle.

Figure 7:
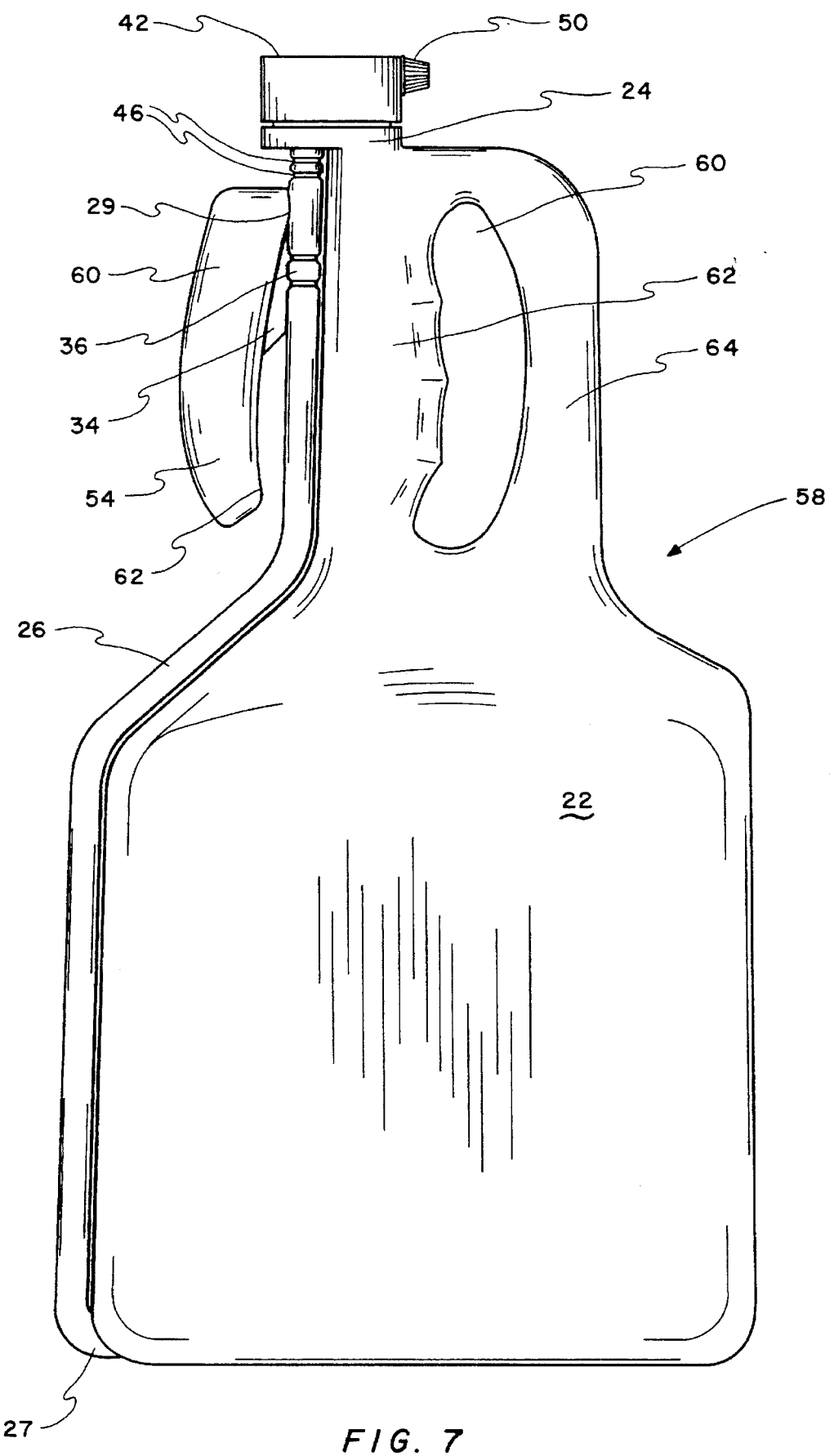
FIG. 7 is a side elevation view of a third embodiment of the invention, including a large capacity spray bottle with a palm-driven trigger bulb pump.

The large capacity spray bottle 58 shown in FIG. 7 is another alternative embodiment of the invention. The reference numerals designate corresponding parts in FIGS. 1–6. In the embodiment of FIG. 7, an opening 60 is provided to divide the neck 24 into a finger-grip portion 62 and a handle portion 64.

The user inserts his or her fingers through opening 60 and rests them on finger grip portion 62, while squeezing the smooth trigger bulb 54 with the palm of his or her hand. The results of squeezing trigger bulb 54 with pressure 30 are the same as described above. This embodiment has the advantage of only requiring the use of one hand to simultaneously hold the large bottle and spray the liquid. The handle portion 64 also serves as a convenient means for carrying the large-capacity spray bottle when it is not in use.

While the present invention is described above in connection with preferred or illustrative embodiments, these embodiments are not intended to be exhaustive or limiting of the invention. Rather, the invention is intended to cover all alternatives, modifications, and equivalents included within its spirit and scope, as defined by the appended claims.

What is claimed is:

1. A bottle for spraying or dispensing liquids comprising:
   a) a liquid chamber;
   b) siphon tube integrally formed and in communication with the liquid chamber for receiving liquid from said chamber, said siphon tube extending alongside the liquid chamber;
   c) a trigger bulb in communication with an opening in the siphon tube for receiving liquid from the siphon tube, said trigger bulb separated from said siphon tube by a wall; and
   d) means for preventing a back-flow of liquid into said liquid chamber through said siphon tube when said trigger bulb is squeezed.

2. The bottle of claim 1 wherein the bottle is blow-molded.

3. The bottle of claim 1 wherein the trigger bulb can hold at least about one ounce of liquid.

4. The bottle of claim 1 wherein the trigger bulb has a convex wall.

5. The bottle of claim 4 wherein the trigger bulb has a finger grip configuration on said convex wall.

6. The bottle of claim 4 wherein said convex wall has a smooth surface.

7. The bottle of claim 6 wherein the bottle has a convex finger grip configuration opposite the smooth trigger bulb.

8. The bottle of claim 1 wherein said liquid chamber has a neck, and said trigger bulb is separated from said neck by said siphon tube.

9. The bottle of claim 1 wherein a web separates the trigger bulb from the siphon tube.

10. The bottle of claim 1 wherein said back-flow prevention means includes a valve seat in the siphon tube and a first check valve positioned above the valve seat adjacent to the opening between the trigger bulb and the siphon tube.

11. The bottle of claim 1 further including a cap permitting the filling and dispensing of liquid into and from said liquid chamber.

12. The bottle of claim 11 wherein the cap includes a nozzle and a second check valve for preventing air from entering the bottle through said nozzle.

13. The bottle of claim 1 having a neck with an opening that divides the neck into a finger-grip portion and a handle portion.

14. A blow-molded bottle for spraying or dispensing liquids comprising:
   a) a liquid chamber;
   b) a siphon tube integrally formed and in communication with the liquid chamber for receiving liquid from said chamber, said siphon tube extending alongside the liquid chamber;
   c) a trigger bulb in communication with an opening in the siphon tube for receiving liquid from the siphon tube, said trigger bulb defined by a pair of opposing walls;
   d) a web formed between the trigger bulb and the siphon tube; and
   e) means in said siphon tube for preventing a back-flow of liquid into said liquid chamber through said siphon tube when said trigger bulb is squeezed.

15. The bottle of claim 14 further including a cap on said liquid chamber permitting the filling of said liquid chamber and the dispensing of liquid from said siphon tube.

16. The bottle of claim 14 wherein the trigger bulb can hold at least about one ounce of liquid.

17. The bottle of claim 14 wherein the trigger bulb has a finger-grip configuration molded into one of said opposing walls.

18. The bottle of claim 14 wherein the trigger bulb extends alongside a portion of said siphon tube.

* * * * *